US009389784B2

(12) United States Patent
Kim et al.

(10) Patent No.: US 9,389,784 B2
(45) Date of Patent: Jul. 12, 2016

(54) DIGITAL DEVICE HAVING SIDE TOUCH REGION AND CONTROL METHOD FOR THE SAME

(71) Applicant: LG ELECTRONICS INC., Seoul (KR)

(72) Inventors: Yongsin Kim, Seoul (KR); Doyoung Lee, Seoul (KR); Sihwa Park, Seoul (KR); Jihwan Kim, Seoul (KR); Sinae Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/267,017

(22) Filed: May 1, 2014

(65) Prior Publication Data

US 2015/0268747 A1 Sep. 24, 2015

(30) Foreign Application Priority Data

Mar. 20, 2014 (KR) .................. 10-2014-0032802

(51) Int. Cl.
*G06F 3/0488* (2013.01)
*G06F 3/0481* (2013.01)
*G06F 3/041* (2006.01)

(52) U.S. Cl.
CPC .......... *G06F 3/04886* (2013.01); *G06F 3/0412* (2013.01); *G06F 3/0488* (2013.01); *G06F 3/04817* (2013.01); *G06F 2203/0339* (2013.01); *G06F 2203/04104* (2013.01); *G06F 2203/04808* (2013.01)

(58) Field of Classification Search
CPC ................. G06F 3/0412; G06F 2203/04104; G06F 3/01; G06F 3/017; G06F 3/041; G06F 3/0488–3/04886; G06F 3/048; G06F 2203/0339; G06F 2203/04808
USPC ................................................... 345/173–178
See application file for complete search history.

(56) References Cited

U.S. PATENT DOCUMENTS

| 2004/0012572 | A1* | 1/2004 | Sowden et al. | 345/173 |
| 2006/0238517 | A1* | 10/2006 | King et al. | 345/173 |
| 2011/0122085 | A1 | 5/2011 | Chang | |
| 2012/0274597 | A1* | 11/2012 | Forstall et al. | 345/173 |
| 2013/0093689 | A1 | 4/2013 | Papakipos et al. | |
| 2013/0234982 | A1* | 9/2013 | Kang | 345/174 |
| 2014/0055367 | A1* | 2/2014 | Dearman et al. | 345/173 |

* cited by examiner

*Primary Examiner* — David Tung
(74) *Attorney, Agent, or Firm* — Birch, Stewart, Kolasch & Birch, LLP

(57) ABSTRACT

Disclosed are a digital device and a control method for the same. The digital device may set a device grip mode upon detecting that a user grips the digital device and maintains the multiple touch inputs to a first region set in a side of the digital device. The processor may set a portion of the first region to a first touch enable region upon detecting that a first touch input, among the multiple touch inputs maintained in the device grip mode, is released at a first position, the first touch enable region containing the first position. The processor may execute a first function in response to a touch input of touching the first touch enable region.

20 Claims, 15 Drawing Sheets

FIG. 2
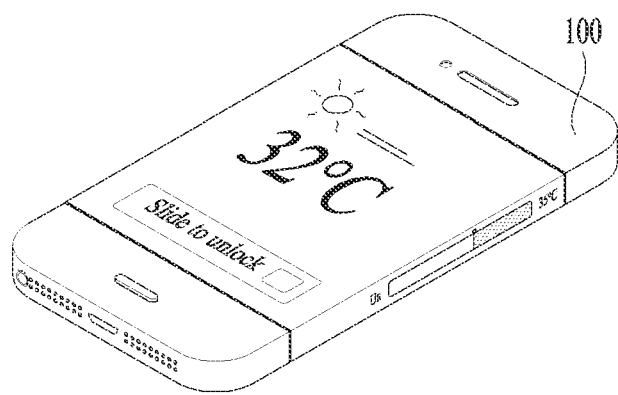
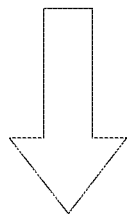
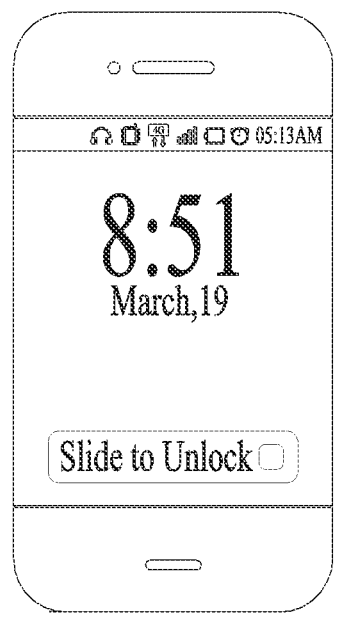
Front View
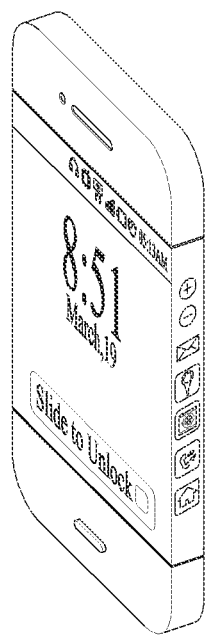
Side View

FIG. 3B
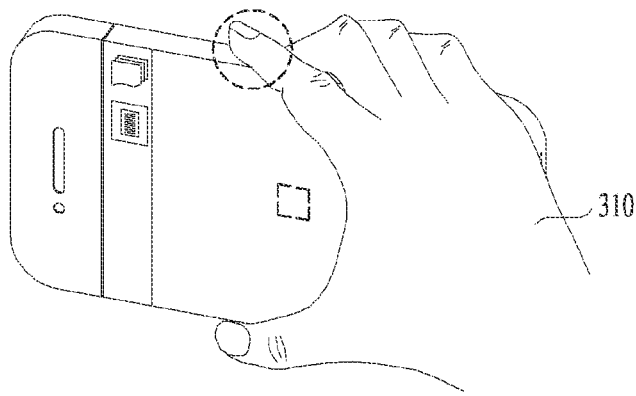
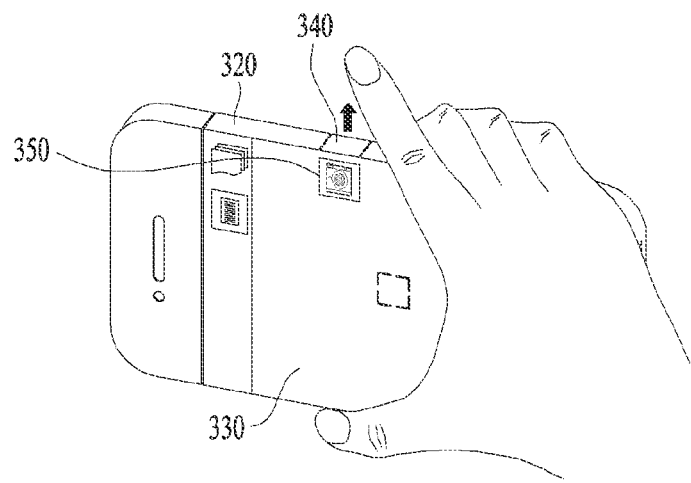
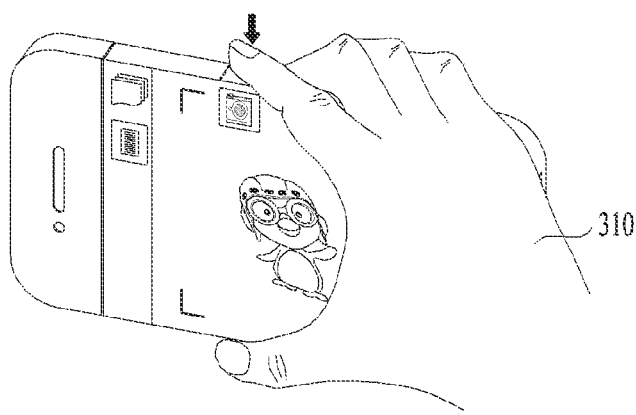

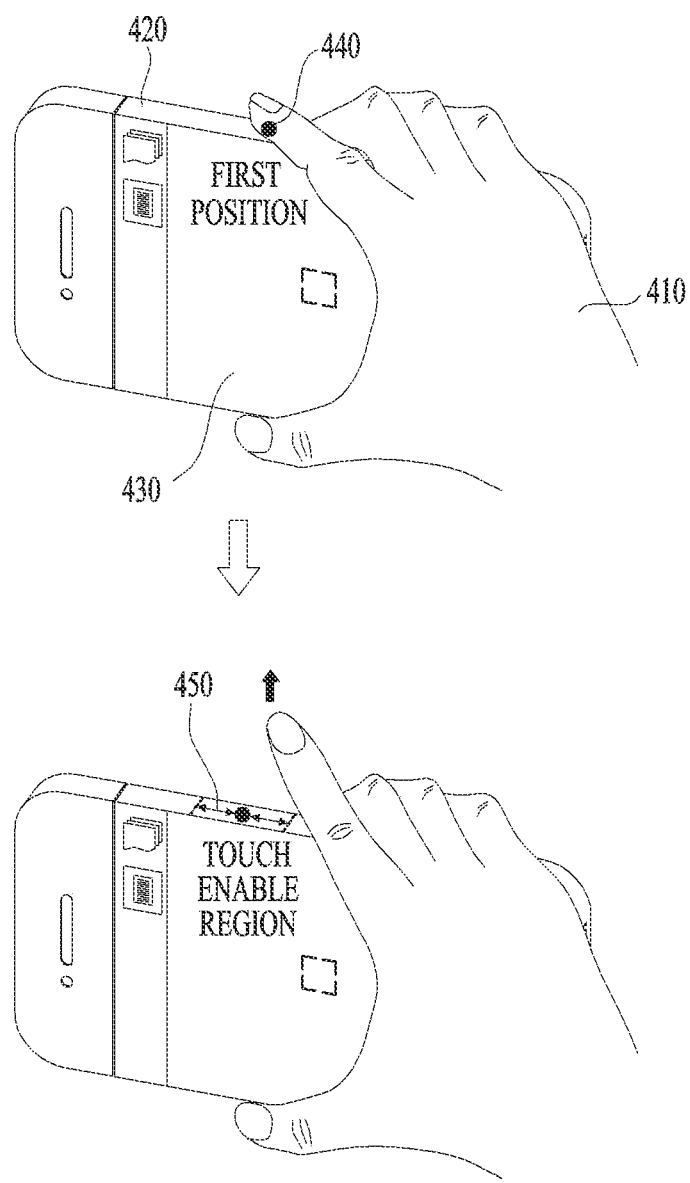

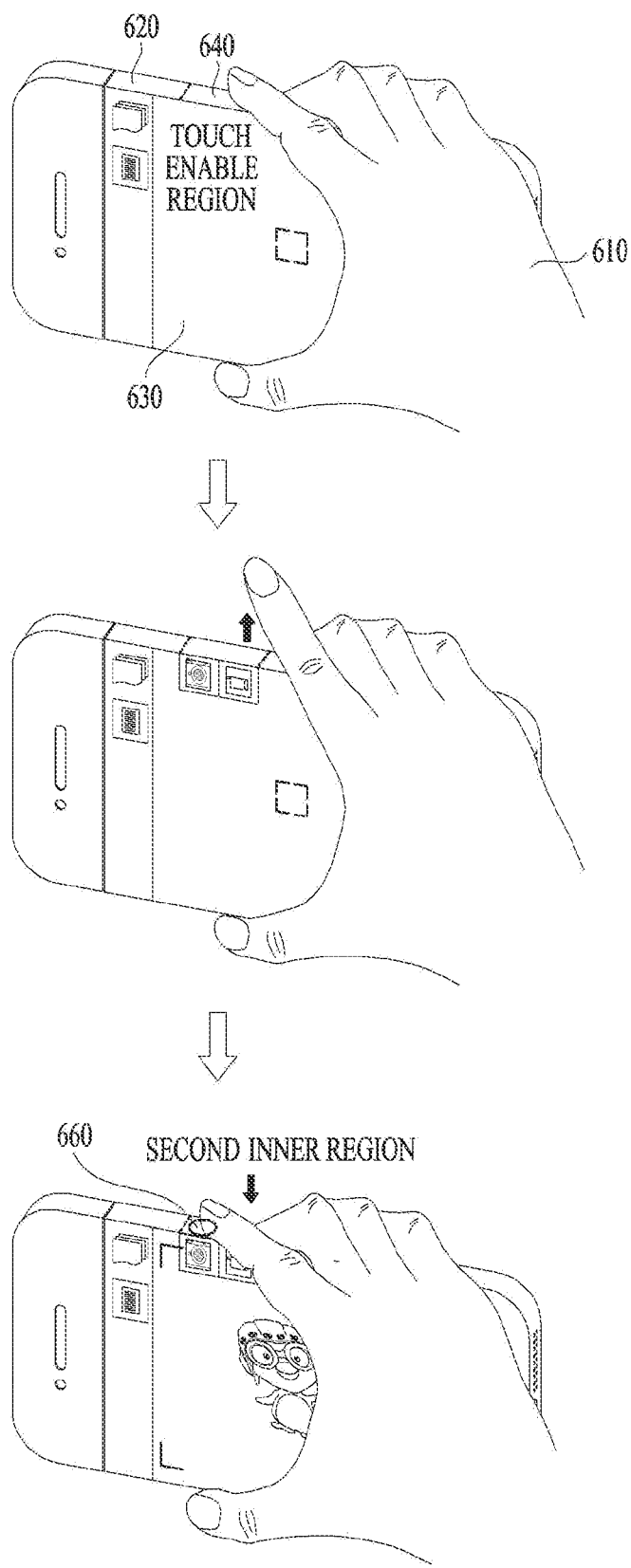

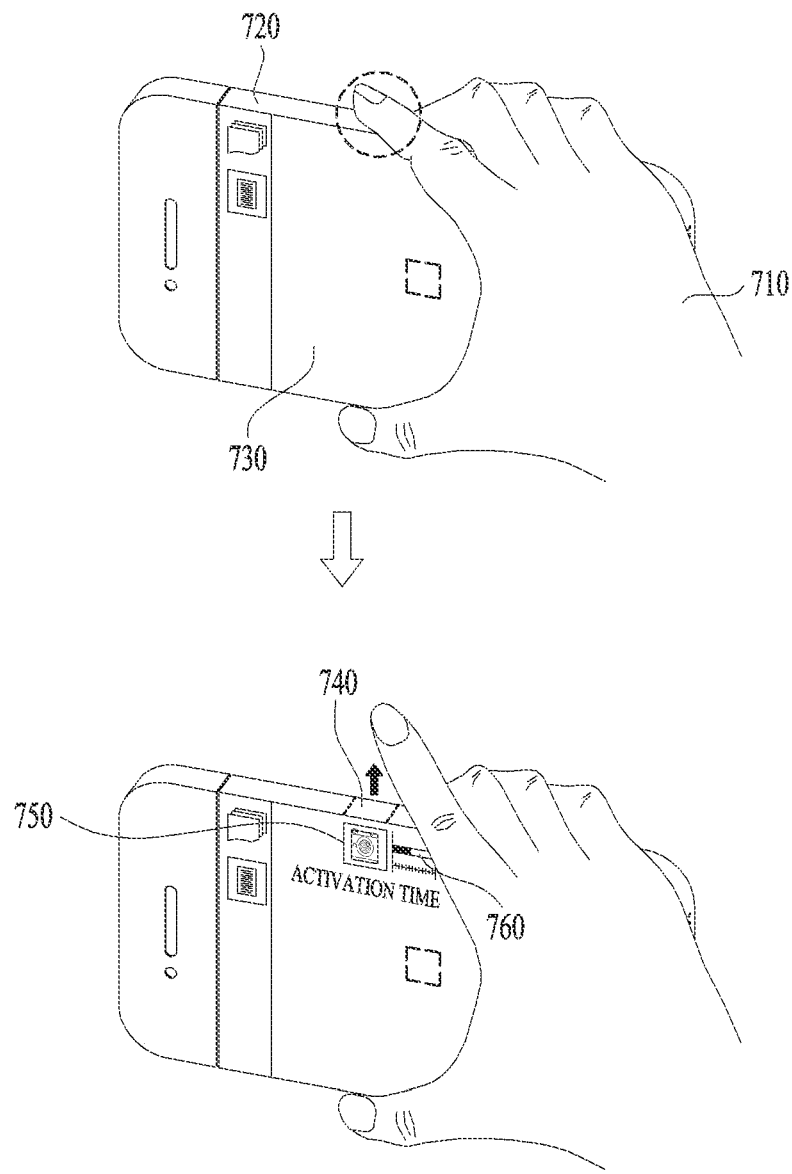

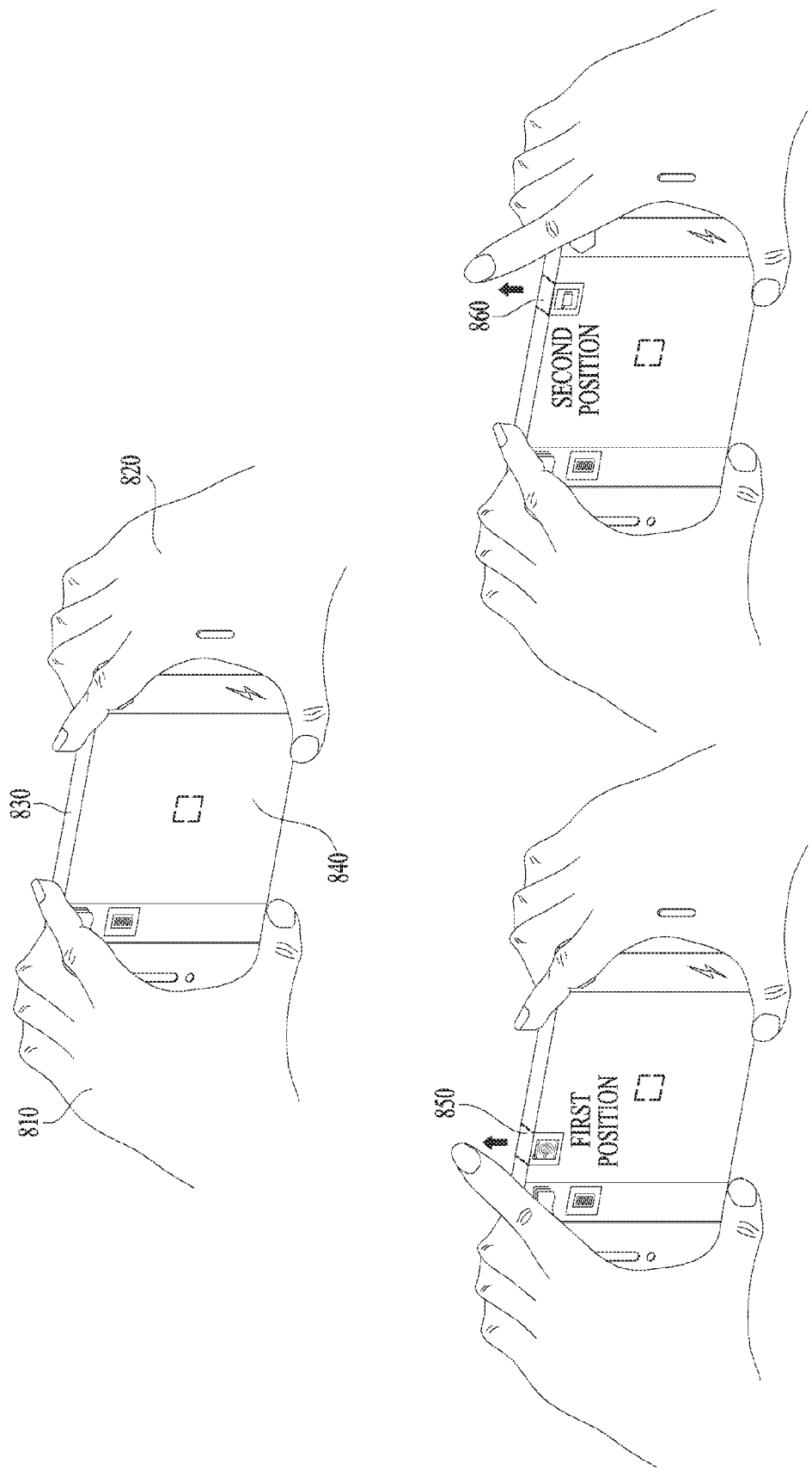

FIG. 9B
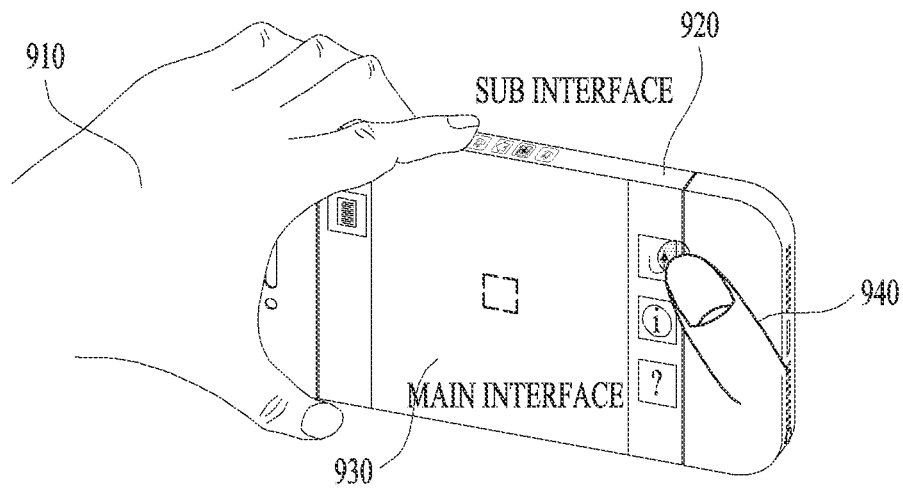
↓ SETTING OF DEVICE GRIP MODE
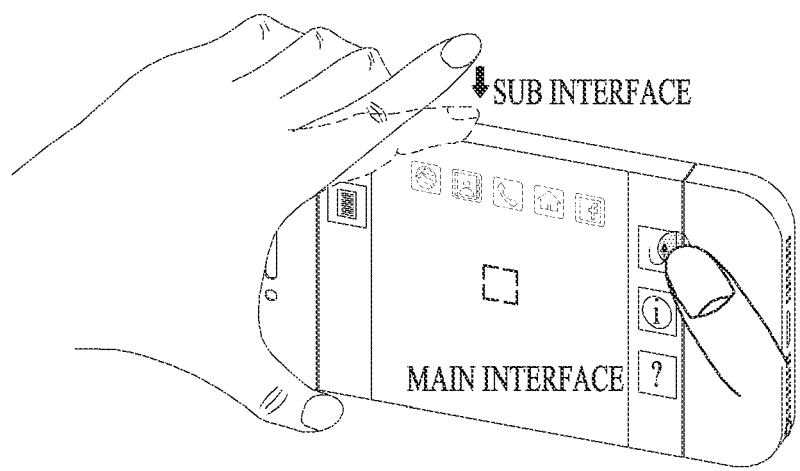

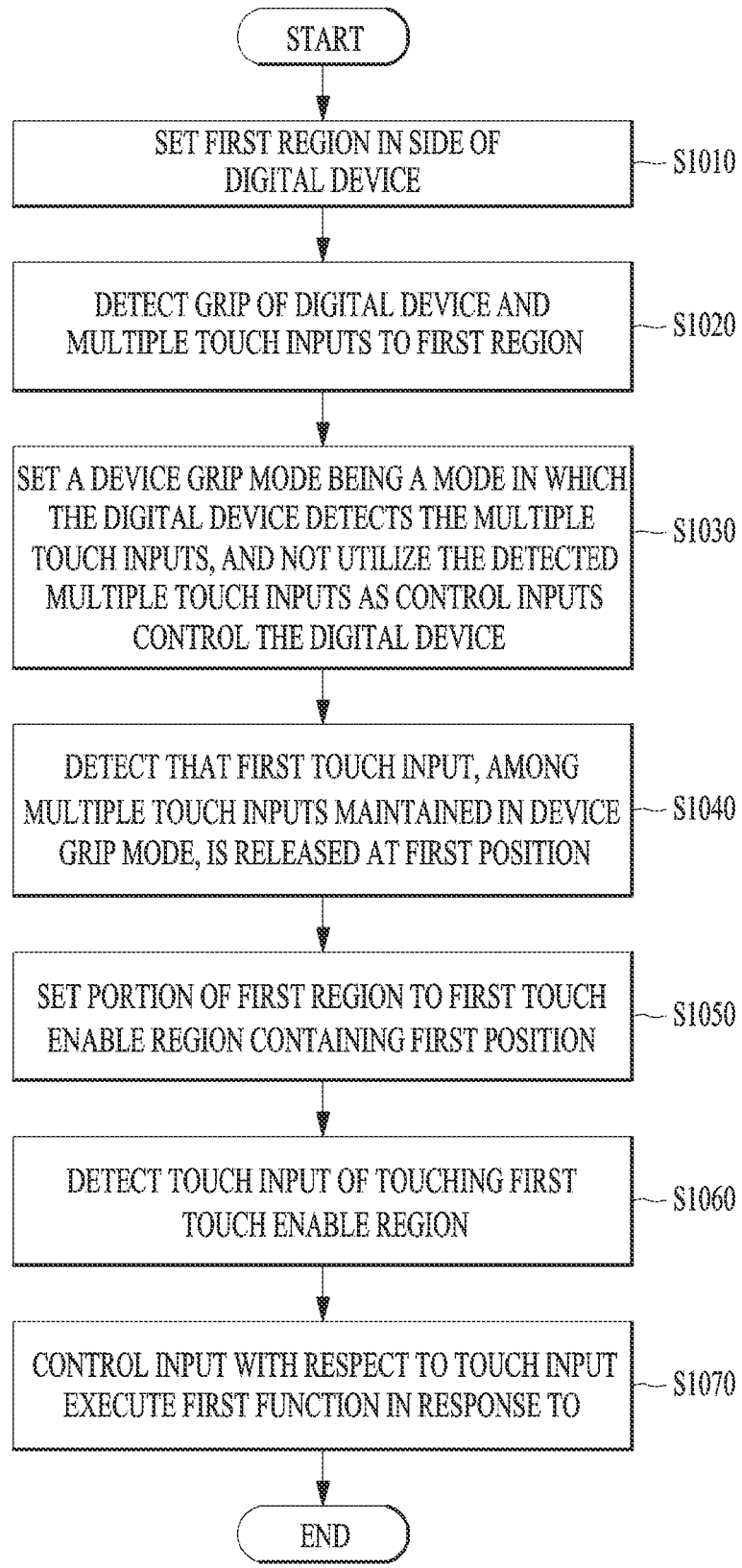

DIGITAL DEVICE HAVING SIDE TOUCH REGION AND CONTROL METHOD FOR THE SAME

Pursuant to 35 U.S.C. §119(a), this application claims the benefit of Korean Patent Application No. 10-2014-0032802 filed on Mar. 20, 2014, which is hereby incorporated by reference as if fully set forth herein.

BACKGROUND OF THE INVENTION

1. Field of the Invention

The present specification relates to a digital device having a side touch region and a control method for the same. More particularly, the present specification relates to a method for a digital device to execute a function when the digital device detects that one touch input among multiple touch inputs to a side touch region is released, and detects a new touch input at a position where the touch input is released.

2. Discussion of the Related Art

A digital device may display visual information on a front thereof. In addition, the digital device may execute a function based on a user touch input of touching the front of the digital device. In this case, the digital device may include a button at a side thereof, the button being used to control the digital device. In one example, the digital device may provide a standby mode or a rest mode based on a user input of pushing the button. Recently, a digital device, which may display visual information on a side thereof and may detect a user touch input to the side face, has been developed.

However, due to the fact that the user tends to grip the side of the digital device when using the digital device, the digital device may detect an unintentional user touch input.

Therefore, the digital device may need to distinguish between user contact that the user simply grips the digital device and a user touch input of executing a function of the digital device. More specifically, the digital device needs to judge whether or not a user touch input of touching the side of the digital device is a control input for control of the digital device.

SUMMARY OF THE INVENTION

Accordingly, the present specification is directed to a digital device having a side touch region and a control method for the same that substantially obviate one or more problems due to limitations and disadvantages of the related art.

An object of the present specification is to provide a method for a digital device to execute a touch rejection upon detecting that a user grips the digital device and maintains multiple touch inputs to a side of the digital device.

Another object of the present specification is to provide a method for a digital device to activate a new touch input upon detecting that a user who maintains multiple touch inputs to a side of the digital device releases one touch input, the new touch input being activated at a position where the touch input is released, and to execute a function upon detecting the new touch input.

Another object of the present specification is to provide a method for a digital device to set a region, where a new touch input is activated, based on a position where a previous touch input is released.

Another object of the present specification is to provide a method for a digital device to execute different functions based on a position where a touch input is released.

Another object of the present specification is to provide a method for a digital device to execute a function based on a corresponding one of multiple touch inputs upon detecting that the corresponding touch input is released.

Another object of the present specification is to provide a method for a digital device to activate a touch input at a position where a previous touch input is released, and to again inactivate the activated touch input after a threshold time has passed.

A further object of the present specification is to provide a method for a digital device to display visual information on a position of a front of the digital device corresponding to a position where a touch input is released.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a digital device includes a touch sensor unit configured to detect a touch input of touching at least one of a first region and a second region and to transmit the detected touch input to a processor, wherein the first region being set in a side of the digital device, and the second region being set in a front of the digital device, a display unit configured to display visual information in the second region, and the processor configured to control the display unit and the touch sensor unit, wherein the processor is further configured to set a device grip mode upon detecting that a user grips the digital device and maintains multiple touch inputs to the first region, wherein the device grip mode being a mode in which the digital device detects the multiple touch inputs, and not utilize the detected multiple touch inputs as control inputs control the digital device, set a first touch enable region containing a first position at a portion of the first region upon detecting that a first touch input is released at the first position, wherein the first touch input is one of the multiple touch inputs maintained in the device grip mode, and execute a first function upon detecting a touch input of touching the first touch enable region.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings:

FIG. 2 is a view showing a digital device, which displays visual information on a side thereof and detects a touch input to the side face, in accordance with one embodiment of the present specification;

FIGS. 3A and 3B are views showing a method for the digital device to set a touch enable region in a first region and to execute a function in response to a new touch input of touching the touch enable region in accordance with one embodiment of the present specification;

FIG. 4 is a view showing a threshold distance of a touch enable region in accordance with one embodiment of the present specification;

FIGS. 6A and 6B are views showing a method for the digital device to execute a function based on a touch input position detected in a touch enable region in accordance with one embodiment of the present specification;

FIGS. 7A and 7B are views showing a method for the digital device to display visual information in a second region based on a touch enable region in accordance with one embodiment of the present specification;

FIG. 8 is a view showing a method for the digital device to execute a function based on positions where multiple touch inputs are released in accordance with one embodiment of the present specification;

FIGS. 9A and 9B are views showing a method for the digital device to set a device grip mode in accordance with one embodiment of the present specification; and FIG. 10 is a view showing a control method for the digital device in accordance with one embodiment of the present specification.

DETAILED DESCRIPTION OF THE INVENTION

Figure 1:
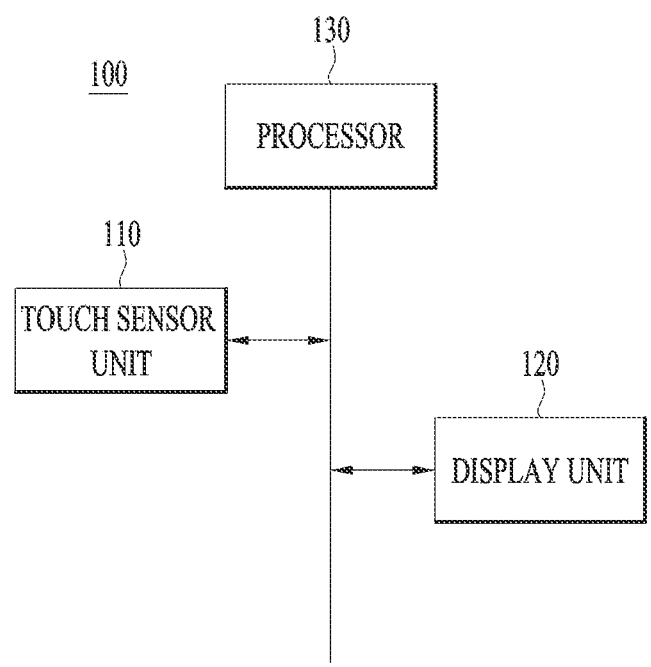
FIG. 1 is a block diagram of a digital device in accordance with one embodiment of the present specification.

Hereinafter, exemplary embodiments will be described in detail with reference to the accompanying drawings and illustrations of the accompanying drawings, but the scope of the present specification to be claimed should not be restricted or limited by the embodiments.

Although the terms used in the following description are selected, as much as possible, from general terms that are widely used at present while taking into consideration the functions obtained in accordance with the embodiments, these terms may be replaced by other terms based on intensions of those skilled in the art, customs, emergence of new technologies, or the like. Also, in a particular case, terms that are arbitrarily selected by the applicant may be used. In this case, the meanings of these terms may be described in corresponding description parts of the specification. Accordingly, it should be noted that the terms used herein should be construed based on practical meanings thereof and the whole content of this specification, rather than being simply construed based on names of the terms.

In the present specification, a digital device, designated by reference numeral 100, may refer to an electronic appliance that detects a user input and displays visual information on a display unit. More specifically, the digital device 100 may be a smartphone, a smart pad, a tablet Personal Computer (PC), a Personal Digital Assistant (PDA), a laptop computer, or the like. In addition, the digital device 100 may be a device that detects a user control input and displays visual information, without being limited to this embodiment.

In the present specification, the digital device 100 may display visual information on a side thereof. In addition, the digital device 100 may detect a user touch input to the side thereof. More specifically, the digital device 100 may normally display visual information on a front thereof and detect a user touch input of touching the front thereof. In the present specification, the digital device 100 may additionally display visual information on the side thereof, and detect a user touch input of touching the side thereof. This will be described below with reference to FIG. 1.

FIG. 1 is a block diagram of the digital device 100 in accordance with one embodiment of the present specification. The digital device 100 may include a touch sensor unit 110, a display unit 120, and a processor 130.

The touch sensor unit 110 may detect a user touch input. In this case, the digital device 100 may include the touch sensor unit 110 at the front and the side thereof. More specifically, the digital device 100 may detect a user touch input of touching the front thereof using the touch sensor unit 110. In addition, the digital device 100 may detect a user touch input of touching the side thereof using the touch sensor unit 110. In one example, the digital device 100 may detect a user touch input of touching the front and the side thereof using the single touch sensor unit 110. The touch sensor unit 110 may be fabricated using a flexible material, for example. In this way, the digital device 100 may construct the touch sensor unit 110 using a single panel, and detect a user touch input to the front and the side thereof. In an alternative example, the digital device 100 may include a front touch sensor unit and a side touch sensor unit, which are separate from each other, without being limited to this embodiment.

The touch sensor unit 110 may detect a user touch input. In this case, the touch input may be variation of an electrical signal caused when a user touches the digital device 100. The digital device 100 may distinguish this touch input as variation of an electrical signal caused when the user touches the digital device 100. The digital device 100 may transmit the detected touch input to the processor 130. Thereby, the digital device 100 may execute a function in response to the detected touch input.

The display unit 120 may display visual information to the user. More specifically, the digital device 100 may display visual information on the front thereof. In this case, the digital device 100 may also display visual information on the side thereof. In one example, the digital device 100 may display visual information on the front and the side thereof using the single display unit 120. The display unit 120 may be fabricated using a flexible material, for example. In this way, the digital device 100 may display visual information on the front and the side thereof using the single flexible display unit 120. In an alternative example, the digital device 100 may include a front display unit and a side display unit, which are separate from each other, without being limited to this embodiment.

The display unit 120 may be a touch sensitive display unit. The touch sensitive display unit may display visual information to the user and detect a user touch input. According to embodiments, the display unit 120 may include at least one of Organic Light Emitting Diode (OLED), Liquid Crystal Display (LCD), electronic ink, Head Mounted Display (HMD), and flexible display units.

The processor 130 may set a first region in the side of the digital device 100. In addition, the processor 130 may set a second region in the front of the digital device 100. In this case, the side may be a rim portion of the digital device 100. That is, on the basis of the front of the digital device 100, both lateral sides and an upper side thereof may be referred to as side faces. In one example, assuming that the digital device 100 is a hexahedron, the digital device 100 may have four side faces except for a front and a rear thereof. The processor 130 may set the entire side to a first region. Alternatively, the processor 130 may set a partial region of the side to the first region. In one example, assuming that the digital device 100 is a hexahedron, only one side among the four side faces may be set to the first region. In another example, a limited partial region of one side may be set to the first region, without being limited to this embodiment.

The processor 130 may set a second region in the front of the digital device 100. In one example, the processor 130 may set the second region in at least one of the front and the rear of the digital device 100. Assuming that the digital device 100 is foldable, the processor 130 may set the second region in at least one of the front and the rear of the digital device 100.

The processor 130 may detect a touch input of touching the first region. The processor 130 may display visual information in the first region. The processor 130 may detect a touch input of touching the second region. The processor 130 may display visual information in the second region.

The processor 130 may detect that the user grips the digital device 100. In this case, the processor 130 may detect that the user grips the digital device 100 upon detecting that the user maintains a touch input to a first side and a second side of the digital device 100. More specifically, in a case in which the user is touching two side faces to support the digital device 100, the processor 130 may detect that the user grips the digital device 100.

The processor 130 may detect that the user grips the digital device 100 and maintains multiple touch inputs to the first region. In addition, the processor 130 may detect that a first touch input among the multiple touch inputs to the first region is released at a first position. In this case, the processor 130 may set a portion of the first region to a touch enable region including the first position, and execute a function in response to a new touch input of touching the touch enable region. This will be described below with reference to FIGS. 3A and 3B.

The above described elements may be included, as separate elements, in the digital device 100, or may be incorporated into one or more elements.

FIG. 2 is a view showing the digital device 100, which displays visual information on the side thereof and detects a touch input to the side face, in accordance with one embodiment of the present specification.

The digital device 100 may display visual information on the front thereof such that the user can view the same. In addition, the digital device 100 may detect a user touch input for control of the visual information displayed on the front thereof. In this case, the digital device 100 may also display visual information on the side thereof. In addition, the digital device 100 may detect a user touch input for control of the visual information displayed on the side thereof. More specifically, referring to front view, the digital device 100 may display visual information on the front thereof. In addition, referring to side view, the digital device 100 may display visual information on the side thereof. In this case, the user can view and control the visual information displayed on the side of the digital device 100. In addition, the digital device 100 may detect a touch input for control of the visual information displayed on the side thereof. In one example, the digital device 100 may include a camera unit (not shown). The user may capture an image using the camera unit of the digital device 100. In this case, the digital device 100 may display a captured and stored image on the front thereof, and may also display visual information for control of the camera unit on the side thereof. The digital device 100 may execute a control command with regard to the image capture of the camera unit in response to a touch input of touching the visual information displayed on the side thereof.

In another example, the digital device 100 may play back a video on the front thereof. In this case, the digital device 100 may display visual information, for control of the video being played back, on the side thereof. The digital device 100 may control the video being played back on the front in response to a touch input of touching the visual information displayed on the side face.

That is, the digital device 100 may display visual information on the side and detect a touch input to the side as needed, without being limited to this embodiment.

Figure 3A:
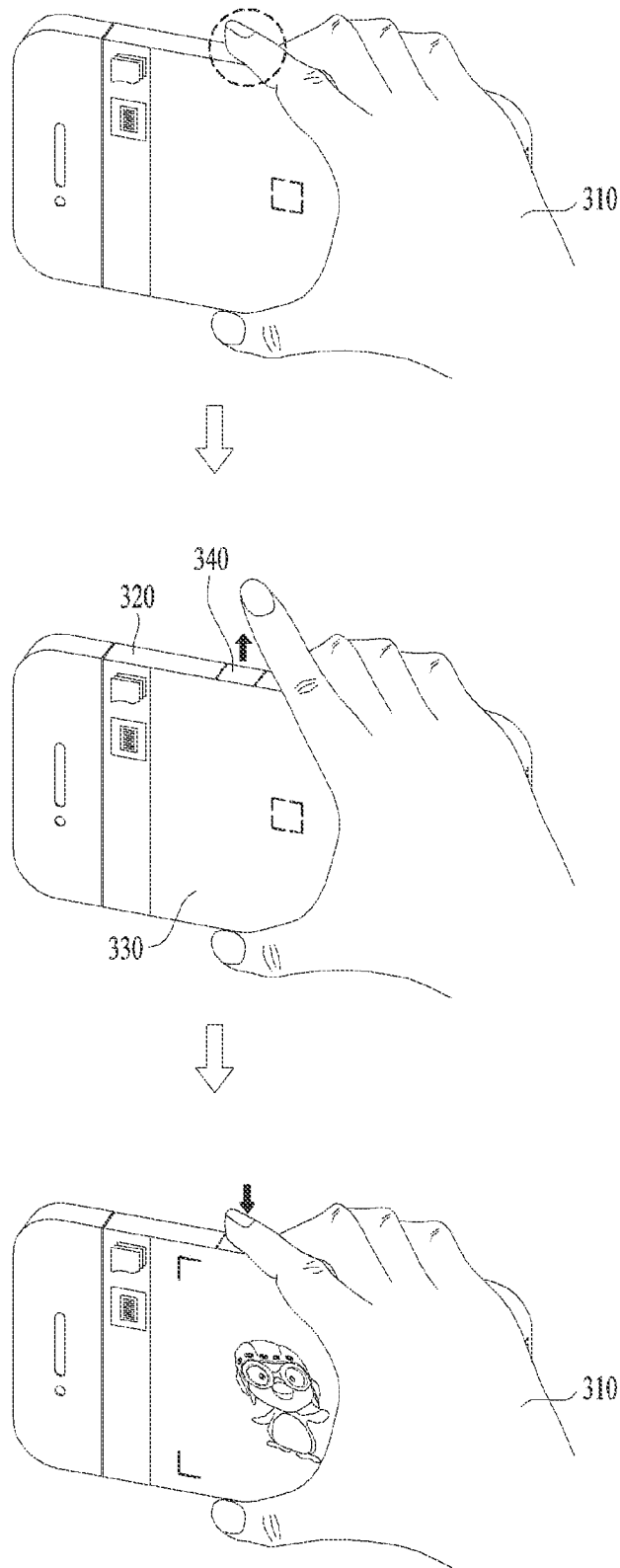

FIGS. 3A and 3B are views showing a method for the digital device 100 to set a first touch enable region 340 in the first region and to execute a function in response to a new touch input of touching the first touch enable region 340 in accordance with one embodiment of the present specification.

The digital device 100 may set a first region 320 in the side thereof. In this case, in one example, the digital device 100 may set one of four side faces thereof to the first region 320. In another example, the digital device 100 may set only a partial region of one side thereof to the first region 320, without being limited to this embodiment. In addition, the digital device 100 may set a second region 330 in the front thereof. The digital device 100 may display visual information in the second region 330. Then, the digital device 100 may detect a touch input of touching at least one of the first region 320 and the second region 330. The digital device 100 may transmit the detected touch input to the processor 130. The processor 130 may execute a function in response to the transmitted touch input. In this case, the function may be a command to execute an application, content, and the like. In addition, the function may be a command to control the application, content, and the like that is being executed by the digital device 100. That is, the function may be a command to control the digital device 100, without being limited to this embodiment.

The digital device 100 may set a device grip mode upon detecting that the user grips the digital device 100 and maintains multiple touch inputs to the first region 320, the device grip mode being a mode in which the digital device detects the multiple touch inputs, and not utilize the detected multiple touch inputs as control inputs control the digital device. In this case, the digital device 100 may detect that the user grips the digital device 100 when the user maintains touch inputs to a first side and a second side of the digital device 100. More specifically, the user may support two side faces to grip the digital device 100. The user may continuously come into contact with both the first side and the second side of the digital device 100. In conclusion, the digital device 100 may detect that the user grips the digital device 100 upon detecting that the user maintains touch inputs to the first side and the second side. In this case, in one example, the digital device 100 may detect that the user grips the digital device 100 when the user maintains touch inputs to the first side and the second side for a threshold time or more. In this case, the threshold time may be a critical time to judge whether or not the user grips the digital device 100. In another example, the digital device 100 may detect that the user grips the digital device 100 when the user maintains touch inputs to at least two faces among the front, the rear, and the sides of the digital device 100. That is, the digital device 100 may detect that the user grips the digital device 100 when the user continuously maintains multiple touch inputs, without being limited to this embodiment.

In addition, the digital device 100 may set a device grip mode upon detecting that the user grips the digital device 100 and maintains multiple touch inputs to the first region 320. In this case, the device grip mode being a mode in which the digital device detects the multiple touch inputs, and not utilize the detected multiple touch inputs as control inputs control the digital device. More specifically, the digital device 100 may detect that the user maintains the multiple touch inputs to the first region 320 using the touch sensor unit 110. The touch sensor unit 110 may detect the multiple inputs, however, the processor 130 does not utilize the multiple touch inputs as control inputs control the digital device. The processor does not execute a function to control the digital device 100 using the multiple touch inputs. That is, once the device grip mode has been set, the digital device 100 does not execute a function in response to a user touch input of continuously touching the digital device 100. In this case, in an alternative example, the digital device 100 may set a device grip mode upon detecting that the user grips the digital device 100 and maintains one touch input to the first region 320. More specifically, the digital device 100 may set a portion of the side thereof to the first region 320. Thus, the user may maintain one touch input to the first region 320 while gripping the digital device 100 and maintaining multiple touch inputs to the corresponding side face. In another alternative example, the digital device 100 may set a device grip mode only when a main user interface is executed in the second region 330 in a state in which the user grips the digital device 100 and maintains multiple touch inputs to the first region 320. In a further alternative example, the digital device 100 may set a device grip mode only upon detecting a touch input of touching an icon displayed in the second region 330 in a state in which the user grips the digital device 100 and maintains multiple touch inputs to the first region 320. This will be described below with reference to FIGS. 9A and 9B.

Upon detecting that the user releases a first touch input, among the multiple touch inputs to the first region 320 maintained in the device grip mode, at a first position, the digital device 100 may set a portion of the first region 320 to the first touch enable region 340 containing the first position. More specifically, the processor 130 may not receive multiple touch inputs maintained in the device grip mode. In this case, the digital device 100 may detect that one touch input among the multiple touch inputs is released at the first position in the first region 320. The digital device 100 may detect electrical variation at the position where the touch input is released, and detect release of the touch input based on the detected electrical variation, without being limited to this embodiment. Upon detecting that the first touch input is released at the first position, the digital device 100 may set the first touch enable region 340 containing the first position. In this case, a region, which contains the first position and is within a threshold distance, may be set to the first touch enable region 340. That is, the first touch enable region 340 may be set in the first region 320 based on the first position.

When the user touches the first touch enable region 340 and the digital device 100 detects such a new touch input, the digital device 100 may execute a first function in response to the new touch input. More specifically, the digital device 100 may set the first touch enable region 340 based on the first position where the touch input is released. That is, the user no longer maintains a touch input to the first touch enable region 340. In such a state, the digital device 100 may detect a new touch input of touching the first touch enable region 340. In this case, the digital device 100 may receive the new touch input from the touch sensor unit 110. Then, the digital device 100 may execute a first function in response to the new touch input. That is, the digital device 100 may detect that a touch input is released, and may be controlled by a user input of retouching a position where the touch input is released.

In one example, in a case in which the first touch enable region 340 is set, the digital device 100 may display visual information 350 in the second region 330. In this case, the visual information 350 may be information related to a first function that will be executed in response to a touch input of touching the first touch enable region 340. In addition, the visual information 350 may be guidance information related to a region in which the first touch enable region 340 is set. A display position of the visual information 350 may be set to a portion of the second region 330 proximate to the first touch enable region 340. In one example, the visual information 350 may be displayed as a guide region corresponding to the first touch enable region 340. This will be described below with reference to FIGS. 7A and 7B.

In addition, in a case in which the device grip mode is set, the digital device 100 may transmit feedback to the user. In this case, the feedback may include at least one of visual feedback, tactile feedback, and audio feedback. The digital device 100 may inform the user of the first region 320 of the digital device 100 being usable by transmitting the feedback to the user.

In one example, referring to FIG. 3B, the digital device 100 may include a camera unit (not shown). In this case, upon detecting that the user grips the digital device 100 and maintains multiple touch inputs to the first region 320, the digital device 100 may set a device grip mode. In one example, the digital device 100 may set a device grip mode only while executing a camera image capture interface as a main user interface. In this case, the digital device 100 may detect that a first touch input, among the multiple touch inputs to the first region 320, is released at a first position. The digital device 100 may set the first touch enable region 340 containing the first position in the first region 320. The first touch enable region 340 may be a region set to execute a command to control the camera image capture interface. The digital device 100 may execute a command to control the camera image capture interface as a first function in response to a touch input of touching the first touch enable region 340. In this case, the first function may be a function of capturing an image using the camera unit (not shown), for example.

FIG. 4 is a view showing a threshold distance of a first touch enable region 450 in accordance with one embodiment of the present specification.

Upon detecting, in a device grip mode, that a first touch input is released at a first position 440, the digital device 100 may set a first touch enable region 450 containing the first position 440. In one example, the digital device 100 may set an extent within a threshold distance from the first position 440 to the first touch enable region 450. In this case, the threshold distance may be a critical distance for setting the first touch enable region 450, and may be within a given tolerance range. The threshold distance may be predetermined by the digital device 100 or the user. In one example, the threshold distance may define a small region containing the first position 440. More specifically, the threshold distance may be extent that the index finger of the user who grips the digital device 100 can reach.

In another example, the digital device 100 may set substantially the entire first region 420, except for contact positions of multiple touch inputs to the first region 420, to the first touch enable region 450. More specifically, in a case in which the digital device 100 detects, in a device grip mode, that a first touch input among multiple touch inputs to the first region 420 is released at the first position 440 in the first region 420, the digital device 100 may set the first region 420 to the first touch enable region 450. In this case, the digital device 100 may judge that the other multiple touch inputs to the first region 420, except for the released first touch input, serve to grip the digital device 100. That is, the digital device 100 may disregard the other multiple touch inputs. Then, in a case in which a new user touch input occurs in the first region 420, the digital device 100 may execute a first function in response to the new user touch input.

In a further example, the digital device 100 may set the first touch enable region 450 in a state in which a main user interface is executed in a second region 430. In this case, the main user interface, for example, may be a camera image capture interface. The digital device 100 may execute a command to control the camera image capture interface in response to a touch input of newly touching the first touch enable region 450 that is within a threshold distance from the first position 440.

Figure 5A:
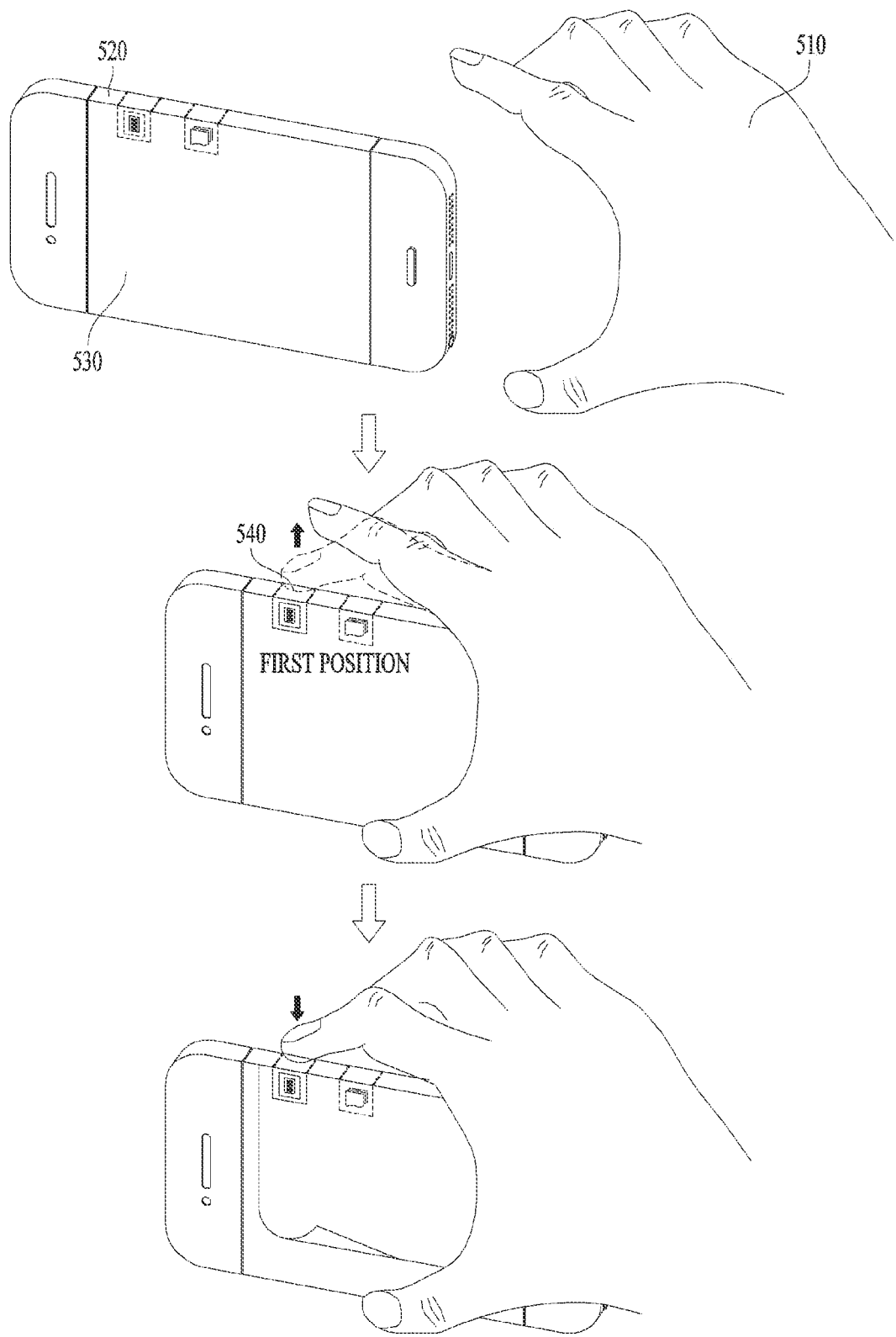
FIGS. 5A and 5B are views showing a method for the digital device to execute a function based on a set position of a touch enable region in accordance with one embodiment of the present specification.
Figure 5B:
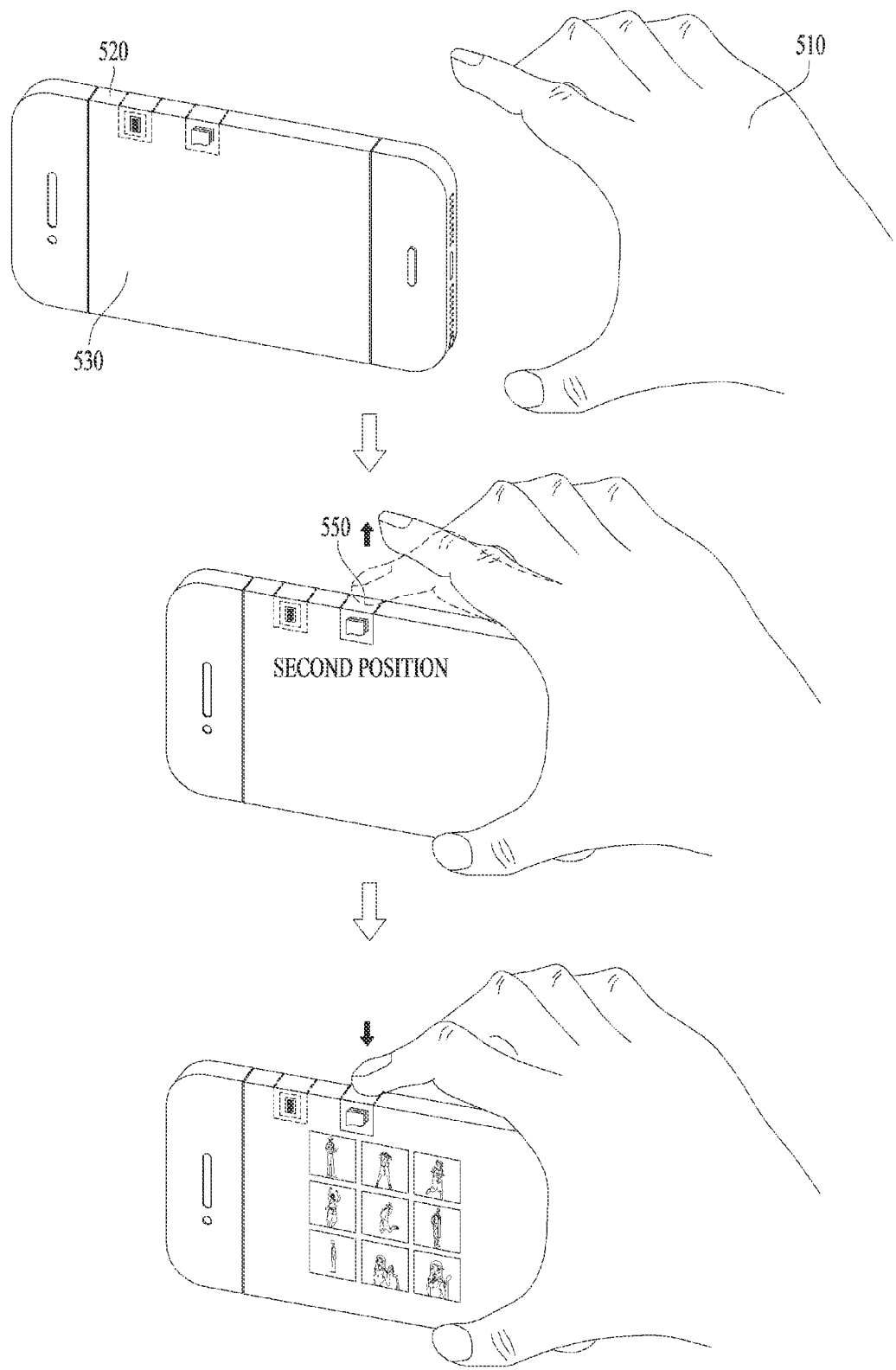

FIGS. 5A and 5B are views showing a method for the digital device 100 to execute a function based on a set position of a touch enable region in accordance with one embodiment of the present specification.

The digital device 100 may set a touch enable region based on a position where a first touch input, among multiple touch inputs maintained in a device grip mode, is released. More specifically, in a case in which the digital device 100 detects that a first touch input, among multiple touch inputs maintained in a device grip mode, is released at a first position, the digital device 100 may set a first touch enable region 540 containing the first position. In this case, the digital device 100 may execute a first function in response to a new touch input of touching the first touch enable region 540. In addition, in a case in which the digital device 100 detects that a first touch input, among multiple touch inputs maintained in a device grip mode, is released at a second position, the digital device 100 may set a second touch enable region 550 containing the second position. In this case, the digital device 100 may execute a second function in response to a new touch input of touching the second touch enable region 550. That is, the digital device 100 may execute different functions based on different positions where the same first touch input among the maintained multiple touch inputs is released.

In one example, referring to FIGS. 5A and 5B, the digital device 100 may detect that a touch input of the user's index finger among the maintained multiple touch inputs is released at a first position. In this case, the digital device 100 may set the first touch enable region 540 containing the first position. In one example, a first function corresponding to the first touch enable region 540 may be a function of executing a memo interface. Thus, upon detecting a new touch input of touching the first touch enable region 540 after the first touch enable region 540 is set by the digital device 100, the digital device 100 may execute the memo interface as the first function in response to the new touch input.

In addition, the digital device 100 may detect that a touch input of the user's index finger among the maintained multiple touch inputs is released at a second position. In this case, the digital device 100 may set the second touch enable region 550 containing the second position. In one example, a second function corresponding to the second touch enable region 550 may be a function of executing a gallery interface. Thus, upon detecting a touch input of newly touching the second touch enable region 550 after the second touch enable region 550 is set by the digital device 100, the digital device 100 may execute the gallery interface as the second function in response to the new touch input. That is, the digital device 100 may execute different functions based on different positions where the same touch input is released. In one example, the digital device 100 may display function information related to a position where a touch input can be released in a second region 530. In this case, the digital device 100 may display information related to each function in a region proximate to the position where the touch input can be released. In this way, the digital device 100 may provide the user with information related to a function that the user can execute.

Figure 6A:
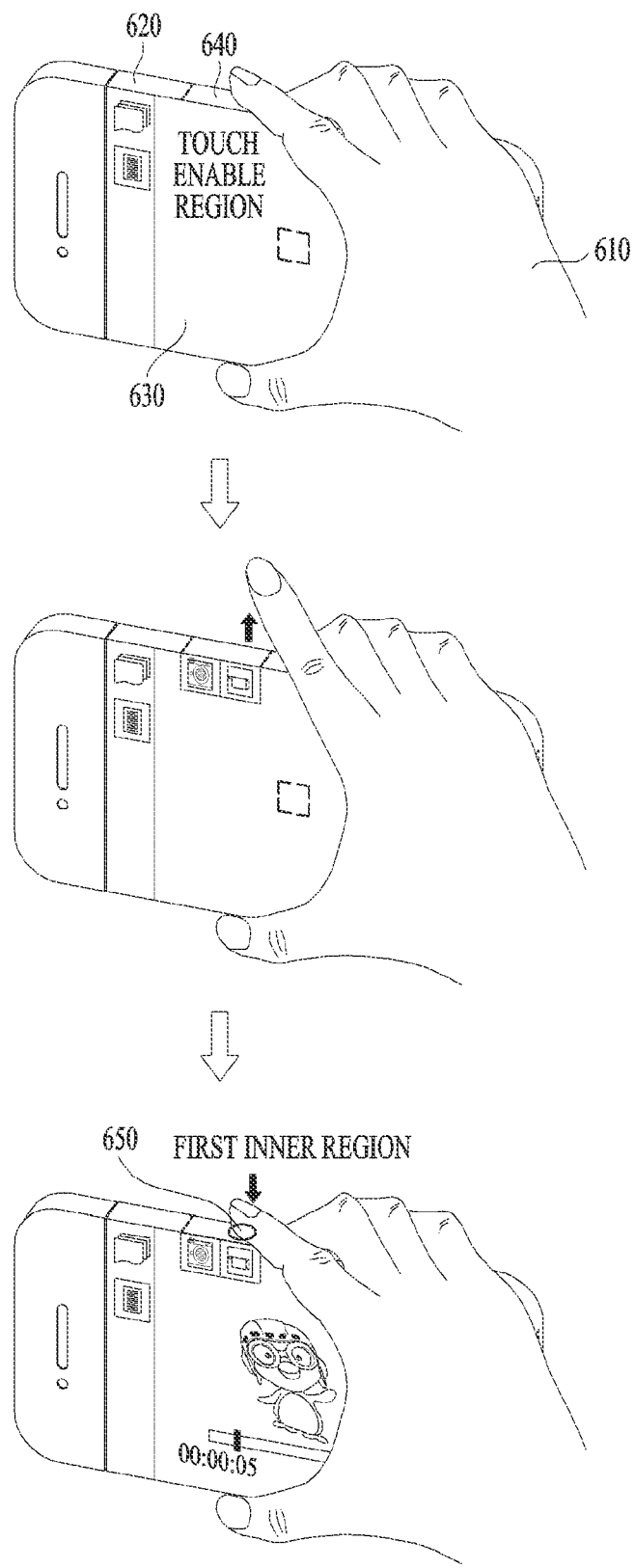

FIGS. 6A and 6B are views showing a method for the digital device 100 to execute a function based on a touch input position detected in a first touch enable region in accordance with one embodiment of the present specification.

When a first touch input among multiple touch inputs maintained in a device grip mode is released at a first position, the digital device 100 may set a first touch enable region 640 containing the first position. In this case, the first touch enable region 640 may be set within a threshold distance from the first position.

The first touch enable region 640 may include a first inner region 650 and a second inner region 660. More specifically, the first touch enable region 640 may be divided into two inner regions within a threshold distance. In one example, the first touch enable region 640 may be divided into two or more inner regions, without being limited to this embodiment.

The digital device 100 may execute different functions in response to a touch input of touching the first inner region 650 and a touch input of touching the second inner region 660. More specifically, in a case in which the first touch enable region 640 is set, the digital device 100 may execute different functions based on positions of touch inputs of newly touching the first touch enable region 640. That is, in a case in which the digital device 100 detects a touch input of newly touching the first inner region 650 included in the first touch enable region 640, the digital device 100 may execute a first function in response to the touch input of touching the first inner region 650. In addition, in a case in which the digital device 100 detects a touch input of newly touching the second inner region 660 included in the first touch enable region 640, the digital device 100 may execute a second function in response to the touch input of touching the second inner region 660. That is, the digital device 100 may be set the single touch enable region 640 to enable execution of multiple functions. In this way, the digital device 100 may provide the user with various functions.

Referring to FIGS. 6A and 6B, the digital device 100 may execute a device grip mode in a state in which a main user interface is executed. The main user interface, for example, may be a camera image capture interface. In this case, the digital device 100 may detect that a first touch input among the maintained multiple touch inputs is released at a first position. Then, the digital device 100 may set the first touch enable region 640 containing the first position. In this case, the first touch enable region 640 may be divided into the first inner region 650 and the second inner region 660. In this case, the digital device 100 may detect a touch input of newly touching the first inner region 650. Then, the digital device 100 may execute a first function in response to the touch input of newly touching the first inner region 650. In this case, the first function may be a function to execute a command to film video using a camera image capture interface. In addition, the digital device 100 may detect a touch input of newly touching the second inner region 660. Then, the digital device 100 may execute a second function in response to the touch input of newly touching the second inner region 660. In this case, the second function may be a function to execute a command to capture an image using the camera image capture interface.

Figure 7B:
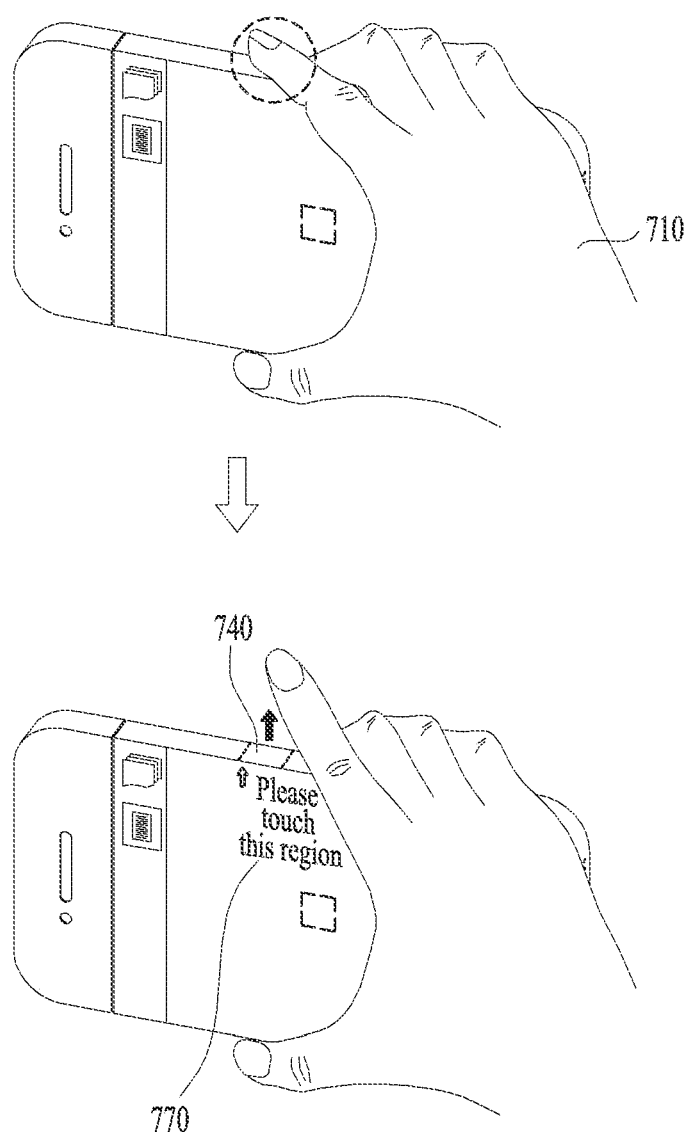

FIGS. 7A and 7B are views showing a method for the digital device 100 to display visual information in a second region based on a first touch enable region in accordance with one embodiment of the present specification.

The digital device 100 may display visual information related to a first touch enable region 740 in a second region 730. More specifically, the user may keep their eyes on the front of the digital device 100 when in use. Thus, the digital device 100 may need to provide the user with information related to the first touch enable region 740 that is set in the side of the digital device 100. The digital device 100 may display the visual information at a second position in the second region 730. In this case, the digital device 100 may set the second position to a position proximate to a first position. More specifically, the first touch enable region 740 may contain the first position and may be set in a first region 720. In conclusion, the digital device 100 may display the visual information related to the first touch enable region 740 at the second position in the second region 730, the second position being proximate to the first position in the first touch enable region 740.

In one example, the digital device 100 may set visual information 750 to information related to a first function. More specifically, the digital device 100 may execute a first function in response to a touch input of touching the first touch enable region 740. In this case, the digital device 100 may display visual information related to the first function at the second position in the second region 730, thereby providing the user with information related to the function to be executed.

In another example, the digital device 100 may set visual information 760 to information related to an activation time of the first touch enable region 740. More specifically, in a case in which a first touch input among the multiple touch inputs maintained in a device grip mode is released at a first position, the digital device 100 may set the first touch enable region 740 containing the first position. In this case, when the digital device 100 does not detect the first touch enable region 740 within a threshold time, the digital device 100 may release the first touch enable region 740. In this case, the threshold time may be a critical time with regard to an activation time during which the first touch enable region 740 is maintained. In addition, the threshold time may be within a given tolerance range, and may be predetermined by the digital device 100 or the user.

The digital device 100 may display information related to a threshold time, during which the first touch enable region 740 is released, in the second region 730. For example, the threshold time information may be information related to a remaining time until the first touch enable region 740 is released. In addition, the threshold time information may be displayed in the form of a progress bar. That is, the threshold time information should not be limited to the above described embodiment, and may be visual information that provides the user with information related to a threshold time. In one example, the digital device 100 may display information related to a first function as well as information related to a threshold time as visual information, without being limited to this embodiment.

In one example, the visual information displayed on the digital device 100 may be an indicator 770 that guides a position of the first touch enable region 740. More specifically, the digital device 100 may set the first touch enable region 740 based on the first position where the first touch input among the multiple touch inputs maintained in the device grip mode is released. In this case, the user cannot view the position where the touch input is released, and therefore cannot know the position and size of the first touch enable region 740. Thus, the digital device 100 may display visual information, such as the indicator 770 that guides the position of the first touch enable region 740, in the second region 730. In this case, for example, the indicator 770 may guide the position and size of the first touch enable region 740. More specifically, the indicator 770 may be displayed in the second region 730 to indicate the size of the first touch enable region 740 of the first region 720. In this case, for example, the digital device 100 may set a second position, where the indicator 770 is displayed, to a position proximate to the first position. In addition, the digital device 100 may display the indicator 770 in a region within a threshold distance from the second position. In this case, the digital device 100 may set the size of the indicator 770 to be equal to the size of the first touch enable region 740.

In addition, the digital device 100 may display visual information related to the first touch enable region 740, without being limited to this embodiment.

FIG. 8 is a view showing a method for the digital device 100 to execute a function based on positions where multiple touch inputs are released in accordance with one embodiment of the present specification.

The digital device 100 may set a first touch enable region 850 containing a first position where a first touch input, among multiple touch inputs maintained in a device grip mode, is released. Then, the digital device 100 may execute a first function in response to a touch input of newly touching the first touch enable region 850. In addition, the digital device 100 may set a second touch enable position 860 containing a second position where a second touch input, among the multiple touch inputs maintained in the device grip mode, is released. Then, the digital device 100 may execute a second function in response to a touch input of newly touching the second touch enable region 860.

More specifically, the user may maintain multiple touch inputs to the first region 830 of the digital device 100 in a device grip mode. That is, the user may continuously touch the first region 830 with multiple fingers. In this case, the digital device 100 may set a touch enable region in response to a released touch input among the maintained multiple touch inputs to the first region 830. The digital device 100 may set different touch enable regions in response to a released touch input among the maintained multiple touch inputs, and execute different functions.

In one example, the user may maintain multiple touch inputs to the first region 830 with both hands. More specifically, referring to FIG. 8, the digital device 100 may detect that a touch input of the index finger of the user's left hand 810 among the multiple touch inputs is released at a first position. In this case, the digital device 100 may set the first touch enable region 850 containing the first position. Then, the digital device 100 may execute a first function in response to a touch input of newly touching the first touch enable region 850. In one example, the digital device 100 may execute a camera image capture interface as a main user interface. In this case, upon detecting a touch input to the first touch enable region 850, the digital device 100 may execute an image capture function as the first function.

In addition, the digital device 100 may detect that a touch input of the index finger of the user's right hand 820 among the multiple touch inputs is released at a second position. In this case, the digital device 100 may set the second touch enable region 860 containing the second position. The digital device 100 may execute a second function in response to a touch input of newly touching the second touch enable region 860. In one example, the digital device 100 may execute a camera image capture interface as a main user interface. In this case, upon detecting a touch input to the second touch enable region 860, the digital device 100 may execute an image capture function as the second function.

In one example, the multiple touch inputs to the first region 830 may be touch inputs of touching the digital device 100 with multiple fingers of one hand. More specifically, the user may maintain the multiple touch inputs to the first region 830 with multiple fingers of one hand. In this case, for example, in a case in which the user's index finger is released from a first position, the digital device 100 may set the first touch enable region 850 based on the first position, and execute a first function. In addition, in a case in which the user's middle finger is released at a second position, the digital device 100 may set the second touch enable region 860 based on the second position, and execute a second function. That is, the digital device 100 may set different touch enable regions in response to a released touch input among the maintained multiple touch inputs, and execute different functions.

Figure 9A:
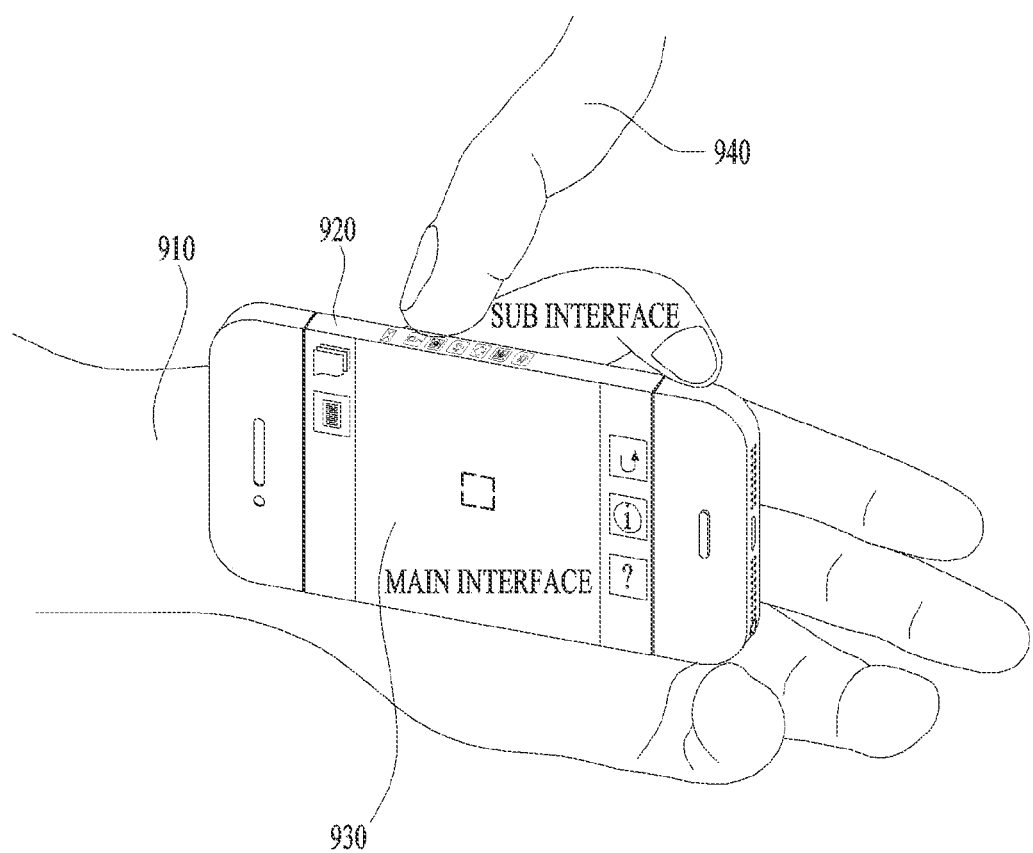

FIGS. 9A and 9B are views showing a method for the digital device 100 to set a device grip mode in accordance with one embodiment of the present specification.

The digital device 100 may execute a main user interface and a sub user interface. In this case, the main user interface and the sub user interface may be independent interfaces to be executed by the digital device 100. In addition, the sub user interface may be an interface associated with the main user interface. For example, the main user interface may be a camera image capture interface. In this case, the sub user interface may be an interface associated with a function of controlling the camera image capture interface.

The digital device 100 may display visual information related to the main user interface in a second region 930. In addition, the digital device 100 may display visual information related to the sub user interface in a first region 920. In this case, the digital device 100 may control the main user interface in response to a touch input of touching an icon displayed at the sub user interface.

In addition, the digital device 100 may display a sub user interface in the first region 920, the sub user interface including a first icon and a second icon. In this case, when the digital device 100 detects that a touch input is released at a position where the first icon is displayed, and sets a first touch enable region, the digital device 100 may execute a first function in response to a touch input of touching the first touch enable region based on the first icon. In addition, when the digital device 100 detects that a touch input is released at a position where the second icon is displayed, and sets a first touch enable region, the digital device 100 may execute a first function in response to a touch input of touching the first touch enable region based on the second icon. That is, the digital device 100 may control execution of a function based on a position where the icon of the sub user interface is displayed.

In a case in which the user grips the digital device 100 and maintains multiple touch inputs to the first region 920 of the digital device 100, the digital device 100 may set a device grip mode upon detecting a touch input of touching an icon displayed in the second region 930. More specifically, the user who uses the digital device 100 may maintain multiple touches to the side of the digital device 100 during use of the digital device 100. In this case, the digital device 100 may set a device grip mode even when the user does not plan to grip the digital device 100, and may malfunction. Thus, the digital device 100 may need to distinguish whether the user grips the digital device 100 to use the digital device 100 or the user sets a device grip mode and executes a function. To this end, the digital device 100 may set a device grip mode upon detecting a touch input of touching an icon displayed in the second region 930 in a state in which the user grips the digital device 100 and maintains multiple touch inputs to the first region 920. In addition, the digital device 100 may set a device grip mode upon detecting that the user grips the digital device 100 and maintains multiple touch inputs to the first region 920 in a state in which a main user interface is displayed in the second region 930.

In addition, in a case in which the digital device 100 detects that the user grips the digital device 100 and maintains multiple touch inputs to the first region 920 and also detects a touch input of touching an icon displayed in the second region 930 in a state in which a main user interface is displayed in the second region 930, the digital device 100 may set a device grip mode. That is, the digital device 100 may execute a device grip mode upon detecting an additional control input in a state in which the user grips the digital device 100 and maintains multiple touch inputs to the first region 920, without being limited to this embodiment.

In a case in which the digital device 100 displays a main user interface in the second region 930, the digital device 100 may execute a first function with regard to the main user interface. That is, the first suction, which is executed in response to a touch input of touching a first touch enable region, may be a function associated with the main user interface.

In one example, the digital device 100 may display a camera image capture interface as a main user interface in the second region 930. The digital device 100 may detect that the user grips the digital device 100 and maintains multiple touch inputs to the first region 920. In this case, the digital device 100 may set a device grip mode upon detecting a touch input of touching a device grip mode execution icon displayed in the second region 930.

FIG. 10 is a view showing a control method of the digital device 100 in accordance with one embodiment of the present specification.

The digital device 100 may set a first region in the side of the digital device 100 (S1010). Referring to FIG. 1, the side may be a rim portion of the digital device 100. More specifically, on the basis of the front of the digital device 100, both lateral sides and an upper side thereof may be referred to as side faces. In one example, assuming that the digital device 100 is a hexahedron, the digital device 100 may have four side faces except for a front and a rear thereof. The digital device 100 may set the entire side to a first region. Alternatively, the digital device 100 may set a partial region of the side to the first region. In one example, assuming that the digital device 100 is a hexahedron, only one side among the four side faces may be set to the first region. In another example, a limited partial region of one side may be set to the first region, without being limited to this embodiment.

The digital device 100 may set a second region in the front thereof. In one example, the digital device 100 may set the second region in at least one of the front and the rear thereof. Assuming that the digital device 100 is foldable, the digital device 100 may set the second region in at least one of the front and the rear thereof.

The digital device 100 may detect that the user grips the digital device 100 and maintains multiple touch inputs to the first region of the digital device 100 (S1020). Referring to FIGS. 3A and 3B, the user may support two side faces to grip the digital device 100. In this case, the user may continuously come into contact with both the first side and the second side of the digital device 100. In conclusion, the digital device 100 may detect that the user grips the digital device 100 upon detecting that the user maintains touch inputs to the first side and the second side face. In this case, in one example, the digital device 100 may detect that the user grips the digital device 100 when the user maintains the touch inputs to the first side and the second side for a threshold time or more. In this case, the threshold time may be a critical time to judge whether or not the user grips the digital device 100. In another example, the digital device 100 may detect that the user grips the digital device 100 when the user maintains touch inputs to at least two faces among the front face, the rear face, and the side faces of the digital device 100. That is, the digital device 100 may detect that the user grips the digital device 100 when the user continuously maintains multiple touch inputs to the digital device 100, without being limited to this embodiment.

The digital device 100 may set a device grip mode being a mode in which the digital device detects the multiple touch inputs, and not utilize the detected multiple touch inputs as control inputs control the digital device (S1030). Referring to FIGS. 3A and 3B, the digital device 100 may set a device grip mode upon detecting that the user grips the digital device 100 and maintains the multiple touch inputs to the first region. In this case, the digital device 100 may disregard multiple touch inputs of touching the first region. More specifically, the digital device 100 may detect that the user maintains the multiple touch inputs to the first region using the touch sensor unit 110. In this case, the processor may not utilize the multiple touch inputs as control inputs control the digital device. The processor 130 does not execute a function to control the digital device 100 using the multiple touch inputs. That is, once the device grip mode has been set, the digital device 100 does not execute a function in response to a user touch input of continuously touching the digital device 100. In an alternative example, the digital device 100 may set a device grip mode upon detecting that the user grips the digital device 100 and maintains one touch input to the first region. More specifically, the digital device 100 may set a portion of the side thereof to the first region. Thus, the user may maintain one touch input to the first region while gripping the digital device 100 and maintaining multiple touch inputs to the corresponding side face. In another alternative example, the digital device 100 may set a device grip mode only when a main user interface is executed in a second region in a state in which the user grips the digital device 100 and maintains multiple touch inputs to the first region.

The digital device 100 may detect that a first touch input, among the multiple touch inputs maintained in the device grip mode, is released (S1040). Referring to FIGS. 3A and 3B, the digital device 100 may disregard the multiple touch inputs to the digital device 100 in the device grip mode. More specifically, the digital device 100 does not utilize the multiple touch inputs as control inputs control the digital device. In this case, the digital device 100 may detect that one touch input among the maintained multiple touch inputs is released at a first position in the first region. In this case, the digital device 100 may detect electrical variation at the position where the touch input is released, and detect release of the touch input based on the electrical variation, without being limited to this embodiment.

The digital device 100 may set a portion of the first region to a first touch enable region containing the first position (S1050). Referring to FIG. 4, the first touch enable region may contain the first position and may be set within a threshold distance from the first position. In one example, the threshold distance may define a small region containing the first position. More specifically, the threshold distance may be extent that the index finger of the user who grips the digital device 100 can reach. In another example, the digital device 100 may set substantially the entire first region, except for contact positions of the multiple touch inputs, to the first touch enable region.

The digital device 100 may detect a touch input of touching the first touch enable region (S1060). Referring to FIGS. 3A and 3B, the touch input of touching the first touch enable region may be a new touch input. More specifically, the digital device 100 may detect a touch input of newly touching the first touch enable region. In this case, the digital device 100 may transmit a control input to the processor 130 in response to an electrical signal with respect to the new touch input.

The digital device 100 may execute a first function in response to the touch input of touching the first touch enable region (S1070). Referring to FIGS. 3A and 3B, the function may be an application, content, and the like that may be executed in the digital device 100. In addition, the function may be a command to control the application, content, and the like that is being executed by the digital device 100. That is, the function may be a command to control the digital device 100. In addition, the digital device 100 may execute a main user interface in the second region. In this case, the first function may be a function with regard to the main user interface.

According to the present specification, a digital device may include a touch region in a side thereof.

According to the present specification, the digital device may execute a touch rejection upon detecting that a user grips the digital device and maintains multiple touch inputs to the side of the digital device.

According to the present specification, in a case in which the digital device detects that the user releases one touch input among the multiple touch inputs to the side of the digital device, the digital device may activate a new touch input at a position where the touch input is released, and then execute a function upon detecting the new touch input.

According to the present specification, the digital device may set a region, where a new touch input is activated, based on a position where a previous touch input is released.

According to the present specification, the digital device may execute a function based on a position where a touch input is released.

According to the present specification, in a case in which the digital device detects each of multiple touch inputs is released, the digital device may execute a function based on the released touch input.

According to the present specification, in a case in which the digital device activates a new touch input at a position where a previous touch input is released, the digital device may again inactivate the activated touch input after a threshold time has passed.

According to the present specification, the digital device may display visual information on a front thereof at a position corresponding to a position where a touch input is released.

In the above description, although the respective drawings show different embodiments for convenience of explanation, it will be appreciated that the embodiments illustrated in the respective drawings may be combined to realize new embodiments. Also, designing a computer readable recording medium in which programs for execution of the above described embodiments are recorded according to demands of those skilled in the art is within the scope of the present invention.

The digital device and the control method for the same in accordance with the present specification are not limited to the configuration and method of the above described various embodiments, and those skilled in the art will appreciate that various modifications and/or substitutions are possible. For example, those skilled in the art may selectively combine all or some of the respective embodiments of the present specification.

Meanwhile, the digital device and the control method for the same in accordance with the present specification may be implemented as code that may be written on a processor readable recording medium and thus read by a processor provided in a network device. The processor readable recording medium may be any type of recording device in which data is stored in a processor readable manner. Examples of the processor readable recording medium may include a ROM, a RAM, a magnetic tape, a floppy disc, and an optical data storage device. In addition, the processor readable recording medium includes a carrier wave (e.g., data transmission over the Internet). Also, the processor readable recording medium may be distributed over a plurality of computer systems connected to a network so that processor readable code is written thereto and executed therefrom in a decentralized manner.

It will be apparent that, although the preferred embodiments of the present specification have been shown and described above, the present specification is not limited to the above-described specific embodiments, and various modifications and variations can be made by those skilled in the art without departing from the gist of the appended claims. Thus, it is intended that the modifications and variations should not be understood independently of the technical sprit or prospect of the specification.

Furthermore, in the present specification, both a device invention and a method invention have been described, and explanations of both inventions may be applied complementally as necessary.

What is claimed is:

1. A digital device comprising:
   a processor;
   a touch sensor unit configured to detect multiple touch inputs to a first region and a second region and to transmit the detected multiple touch inputs to the processor,
   wherein the first region is set in a side surface of the digital device, and the second region is set in a front surface of the digital device, and
   wherein the side surface and the front surface are discriminated by at least one edge of the digital device; and
   a display unit configured to display first visual information in the second region, wherein the processor is configured to:
   set a device grip mode when the touch sensor unit detects the multiple touch inputs to the first region during a predetermined time period,
   wherein the device grip mode is a mode in which the touch sensor unit detects the multiple touch inputs, and does not use the detected multiple touch inputs to control the digital device,
   set a third region related to a predetermined first function when a first touch input of the multiple touch inputs is released from a first position of the first region while the device grip mode is set,
   wherein the third region includes the first position and is set to extend within a threshold distance from the first position in the first region,
   wherein remaining region of the first region except the third region maintains the device grip mode, and
   wherein the first visual information related to the predetermined first function in the second region is displayed while the first touch input is released from the first region, and
   execute the predetermined first function when a second touch input of the multiple touch inputs is detected in the third region within a threshold time,
   wherein the processor is further configured to:
   display the first visual information at a second position in the second region,
   wherein the second position corresponds to a position in the first region where the third region is set, and
   wherein the first visual information is information related to a remaining time of the threshold time, and release the third region when the threshold time is passed without the second touch input.

2. The digital device according to claim 1, wherein the processor is further configured to set a portion of the first region, except for contact positions of the multiple touch inputs, to the third region.

3. The digital device according to claim 2, wherein the processor is further configured to:
   set a fourth region containing a second position at the portion of the first region upon detecting that the second touch input is released at the second position, and
   execute a second function when a third touch input of the multiple touch inputs is detected in the fourth region.

4. The digital device according to claim 1, wherein the third region includes a first inner region and a second inner region, and
   wherein the processor is further configured to:
   if the third region is set,
   execute the predetermined first function when a third touch input of the multiple touch inputs is detected in the first inner region, and
   execute a second function when the third touch input is detected in the second inner region.

5. The digital device according to claim 1, wherein the processor is further configured to release the set third region when the second touch input is not detected in the third region within a threshold time.

6. The digital device according to claim 1, wherein the first visual information is information related to the predetermined first function to be executed corresponding to the first touch input detected in the third region.

7. The digital device according to claim 1, wherein the first visual information is an indicator guiding a position of the third region.

8. The digital device according to claim 7, wherein the processor is further configured to set the second position to be adjacent to the first position, and
   set a region within a threshold distance from the second position to the indicator,
   wherein the indicator has the same size as that of the third region.

9. The digital device according to claim 1, wherein the processor is further configured to set the device grip mode upon detecting that a user grips the digital device and maintains the multiple touch inputs to the first region and detecting a touch input of touching an icon displayed in the second region.

10. The digital device according to claim 1, wherein the processor is further configured to set the device grip mode upon detecting that a user grips the digital device and maintains the multiple touch inputs to the first region in a state in which a main user interface is displayed in the second region.

11. The digital device according to claim 10, wherein the processor is further configured to execute the predetermined first function corresponding to the main user interface.

12. The digital device according to claim 11, further comprising a camera unit, wherein the main user interface is an interface using the camera unit.

13. The digital device according to claim 12, wherein the processor is further configured to set the predetermined first function to a function of capturing an image using the camera unit.

14. The digital device according to claim 10, wherein the processor is further configured to display a sub-user interface in the first region, wherein the sub-user interface corresponds to the main user interface and the sub-user interface includes a first icon and a second icon.

15. The digital device according to claim 14, wherein the processor is further configured to:
   execute the predetermined first function based on the first icon when the third region is set at a position where the first icon is displayed, and
   execute the predetermined first function based on the second icon when the third region is set at a position where the second icon is set.

16. The digital device according to claim 1, wherein the processor is further configured to detect that a user grips the digital device upon detecting that the user maintains touch inputs to a first side and a second side of the digital device.

17. The digital device according to claim 16, wherein the processor is further configured to detect that the user grips the digital device upon detecting that the touch inputs to the first side and the second side are maintained for a threshold time or more.

18. The digital device according to claim 1, wherein the processor is further configured to transmit feedback to a user when the device grip mode is set.

19. The digital device according to claim 18, wherein the feedback includes at least one of visual feedback, audio feedback, and tactile feedback.

20. A control method for a digital device, the method comprising:
   detecting multiple touch inputs to a first region and a second region;
   setting a device grip mode when multiple touch inputs to the first region are detected during a predetermined time period,
   wherein the first region is set in a side surface of the digital device, and the second region is set in a front surface of the digital device,
   wherein the side surface and the front surface are discriminated by at least one edge of the digital device, and
   wherein the device grip mode is a mode in which the multiple touch inputs are detected, and the detected multiple touch inputs are not used to control the digital device;
   setting a third region related to a predetermined first function when a first touch input of the multiple touch inputs is released from a first position of the first region while the device grip mode is set,
   wherein the third region includes the first position and is set to extend within a threshold distance from the first position in the first region, and
   wherein remaining region of the first region except the third region maintains the device grip mode;
   displaying first visual information related to the predetermined first function in the second region while the first touch input is released from the first region;
   executing the predetermined first function when a second touch input of the multiple touch inputs is detected in the third region within a threshold time,
   wherein the processor is further configured to display the first visual information at a second position in the second region,
   wherein the second position corresponds to a position in the first region where the third region is set, and
   wherein the first visual information is information related to a remaining time of the threshold time; and
   releasing the third region when the threshold time is passed without the second touch input.

* * * * *